US010763460B2

(12) United States Patent
Jung

(10) Patent No.: US 10,763,460 B2
(45) Date of Patent: Sep. 1, 2020

(54) CASE ASSEMBLY, PRISMATIC SECONDARY BATTERY, AND FABRICATION METHOD THEREOF

(71) Applicant: Samsung SDI Co., Ltd., Yongin-si, Gyeonggi-do (KR)

(72) Inventor: Kangkook Jung, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 408 days.

(21) Appl. No.: 14/846,233

(22) Filed: Sep. 4, 2015

(65) Prior Publication Data
US 2016/0079579 A1  Mar. 17, 2016

(30) Foreign Application Priority Data

Sep. 16, 2014 (KR) .................. 10-2014-0122922

(51) Int. Cl.
*H01M 2/08* (2006.01)
*H01M 2/02* (2006.01)
*H01M 2/36* (2006.01)
*H01M 2/12* (2006.01)
*H01M 10/52* (2006.01)
*H01M 10/44* (2006.01)

(52) U.S. Cl.
CPC ....... *H01M 2/0217* (2013.01); *H01M 2/0237* (2013.01); *H01M 2/0285* (2013.01); *H01M 2/1235* (2013.01); *H01M 2/361* (2013.01); *H01M 10/446* (2013.01); *H01M 10/52* (2013.01); *H01M 2002/0205* (2013.01)

(58) Field of Classification Search
CPC ............. H01M 2/0217; H01M 2/1235; H01M 2/1241; H01M 2/36; H01M 10/52
See application file for complete search history.

(56) References Cited

U.S. PATENT DOCUMENTS

2002/0150813 A1* 10/2002 Park ...................... H01M 2/361
429/56
2006/0257733 A1* 11/2006 Kim .................... H01M 2/0486
429/185

(Continued)

FOREIGN PATENT DOCUMENTS

KR 10-2012-0050207 A 5/2012
KR 10-2012-0080519 A 7/2012

(Continued)

*Primary Examiner* — James Lee
(74) *Attorney, Agent, or Firm* — Knobbe, Martens, Olson & Bear, LLP

(57) ABSTRACT

Provided are a case assembly, a prismatic secondary battery, and a method of fabricating the prismatic secondary battery. The prismatic secondary battery includes: an electrode assembly including a first electrode plate, a second electrode plate, and a separator between the first and second electrode plates; a case formed of a first material, wherein an electrode assembly accommodation cavity is formed in the case to accommodate the electrode assembly, and an opening through which the electrode assembly is to be inserted is formed in a portion of the case; and a cap plate sealing the opening. A gas discharge hole is formed in the case to discharge gas generated during a pre-charging operation. The gas discharge hole is sealed with a gas seal formed of a second material.

13 Claims, 12 Drawing Sheets

(56) References Cited

U.S. PATENT DOCUMENTS

| | | | | |
|---|---|---|---|---|
| 2010/0233520 A1* | 9/2010 | Suzuki | ............... | H01M 2/0277 |
| | | | | 429/56 |
| 2012/0177982 A1 | 7/2012 | Byun | | |
| 2013/0050959 A1 | 2/2013 | Chang | | |
| 2014/0050959 A1* | 2/2014 | Ryu | ................. | H01M 10/0431 |
| | | | | 429/94 |

FOREIGN PATENT DOCUMENTS

| KR | 10-2013-0130464 A | 12/2013 |
|---|---|---|
| KR | 10-2013-0133659 A | 12/2013 |

* cited by examiner

CASE ASSEMBLY, PRISMATIC SECONDARY BATTERY, AND FABRICATION METHOD THEREOF

RELATED APPLICATIONS

This application claims the benefit of Korean Patent Application No. 10-2014-0122922, filed on Sep. 16, 2014, in the Korean Intellectual Property Office, the disclosure of which is incorporated herein in its entirety by reference.

BACKGROUND

Field

One or more exemplary embodiments relate to a case assembly, a prismatic secondary battery, and a method of fabricating the prismatic secondary battery.

Description of the Related Technology

Secondary batteries are rechargeable batteries. Secondary batteries are widely used in small mobile devices such as smartphones, laptop computers, tablet personal computers, personal digital assistants, camcorders, and digital cameras, or medium and large electronic devices such as electric vehicles, hybrid electric vehicles, electric bicycles, uninterruptible power supplies (UPSs), and energy storage systems (ESSs).

Recently manufactured secondary batteries have thin cases in which electrode assemblies are accommodated. However, if the thickness of a case of a battery is small, the case may be deformed due to gas generated in the battery when the battery is pre-charged.

SUMMARY

One or more exemplary embodiments include a case assembly, a prismatic secondary battery, and a method of fabricating the prismatic secondary battery.

Additional aspects will be set forth in part in the description which follows and, in part, will be apparent from the description, or may be learned by practice of the presented embodiments.

According to one or more exemplary embodiments, a prismatic secondary battery includes: an electrode assembly including a first electrode plate, a second electrode plate, and a separator between the first and second electrode plates; a case formed of a first material, wherein an electrode assembly accommodation cavity is formed in the case to accommodate the electrode assembly, and an opening through which the electrode assembly is to be inserted is formed in a portion of the case; and a cap plate sealing the opening, wherein a gas discharge hole is formed in the case to discharge gas generated during a pre-charging operation, and the gas discharge hole is sealed with a gas seal formed of a second material.

The gas discharge hole may communicate with the electrode assembly accommodation cavity, and the gas seal may be thermally fused to a portion of the case in which the gas discharge hole is formed.

The gas discharge hole may be formed in a bottom portion of the case that is opposite the opening formed in a top portion of the case, and the gas seal may be thermally fused to at least a region of the bottom portion of the case, the region surrounding the gas discharge hole.

The gas seal may include: a first sealing part covering the gas discharge hole; and a second sealing part extending from the first sealing part and thermally fused to a connection region of the bottom portion of the case along a periphery of the gas discharge hole.

The gas seal may cover the gas discharge hole, and the gas seal may extend along a periphery of the gas discharge hole from the bottom portion to a connection region of a lateral portion of the case connecting the bottom portion and the top portion, and the gas seal may be thermally fused to the connection region.

The gas seal may be thermally fused to an inner wall surface of the case that forms the gas discharge hole.

The case may include a can formed of a metallic material.

The gas seal may be formed of a flexible pouch-type material may include: a thin metal layer; and a bonding layer formed on at least one surface of the metal layer and thermally fused to the case.

The case may include: a first surface; a second surface separate from the first surface; third surfaces forming lateral surfaces that connect the first and second surfaces; and a fourth surface located opposite the opening and forming a bottom surface that connect the first surface, the second surfaces, and the third surface, wherein the first surface, the second surface, the third surfaces, and the fourth surface may be continuously connected to form the electrode assembly accommodation cavity, and the gas discharge hole may be formed in the fourth surface.

The electrode assembly may include a plurality of sub-electrode assemblies which have different sizes and are stacked in a stepped structure.

According to one or more exemplary embodiments, a method of fabricating a prismatic secondary battery includes: preparing a case assembly by coupling a gas collection unit to a case, wherein the case includes a gas discharge hole and an electrode assembly accommodation cavity formed to accommodate an electrode assembly including a first electrode plate, a second electrode plate, and a separator; inserting the electrode assembly into the electrode assembly accommodation cavity; filling the electrode assembly accommodation cavity with an electrolyte; pre-charging the electrode assembly and collecting gas, which is generated from the electrode assembly during the pre-charging, in the gas collection unit through the gas discharge hole; and completing the fabricating of the prismatic secondary battery by forming a gas seal to seal the gas discharge hole and removing the gas collection unit.

The case may include a can formed of a metallic material; the gas seal may include a flexible pouch-type material; the gas collection unit may include a main body in which a space is formed to collect gas discharged through the gas discharge hole, and a connection part formed on an end of the main body; and the connection part may be thermally fused to a connection region of a bottom portion of the case in which the gas discharge hole is formed.

The case may include a can formed of a metallic material; the gas seal may include a flexible pouch-type material; the gas collection unit may include a space to collect gas therein; and an end lower surface of the gas collection unit may be thermally fused to a connection region of a lateral portion of the case, the connection region being adjacent to a bottom portion of the case in which the gas discharge hole is formed.

The case may include a can formed of a metallic material; the gas seal may include a flexible pouch-type material; the gas collection unit may include a space to collect gas therein; and an outer surface of the gas collection unit may be thermally fused to an inner wall surface of the case that forms the gas discharge hole.

The gas collection unit may be formed of a flexible pouch-type material and may include: a thin metal layer; and a bonding layer formed on at least one surface of the metal layer and thermally fused to the case.

The gas seal sealing the gas discharge hole may be formed by applying heat and pressure to the gas collection unit to fuse a portion of the gas collection unit, and the gas collection unit may be cut at a position close to a sealed region to separate the gas collection unit from the case.

According to one or more exemplary embodiments, a case assembly of a prismatic secondary battery includes: a case formed of a first material, wherein an electrode assembly accommodation cavity is formed in the case to accommodate an electrode assembly including a first electrode plate, a second electrode plate, and a separator disposed between the first and second electrode plates, and a gas discharge hole is formed in the case to discharge gas therethrough; and a gas collection unit formed of a second material and coupled to the case in which the gas discharge hole is formed, the gas collection unit including a space to collect gas discharged through the gas discharge hole.

The case may include a can formed of a metallic material.

The gas collection unit may be formed of a flexible pouch-type material and may include: a thin metal layer; and a bonding layer formed on at least one surface of the metal layer.

The gas discharge hole may be formed in a portion of the case, and the gas collection unit may be thermally fused to a connection region of the portion of the case in which the gas discharge hole is formed.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
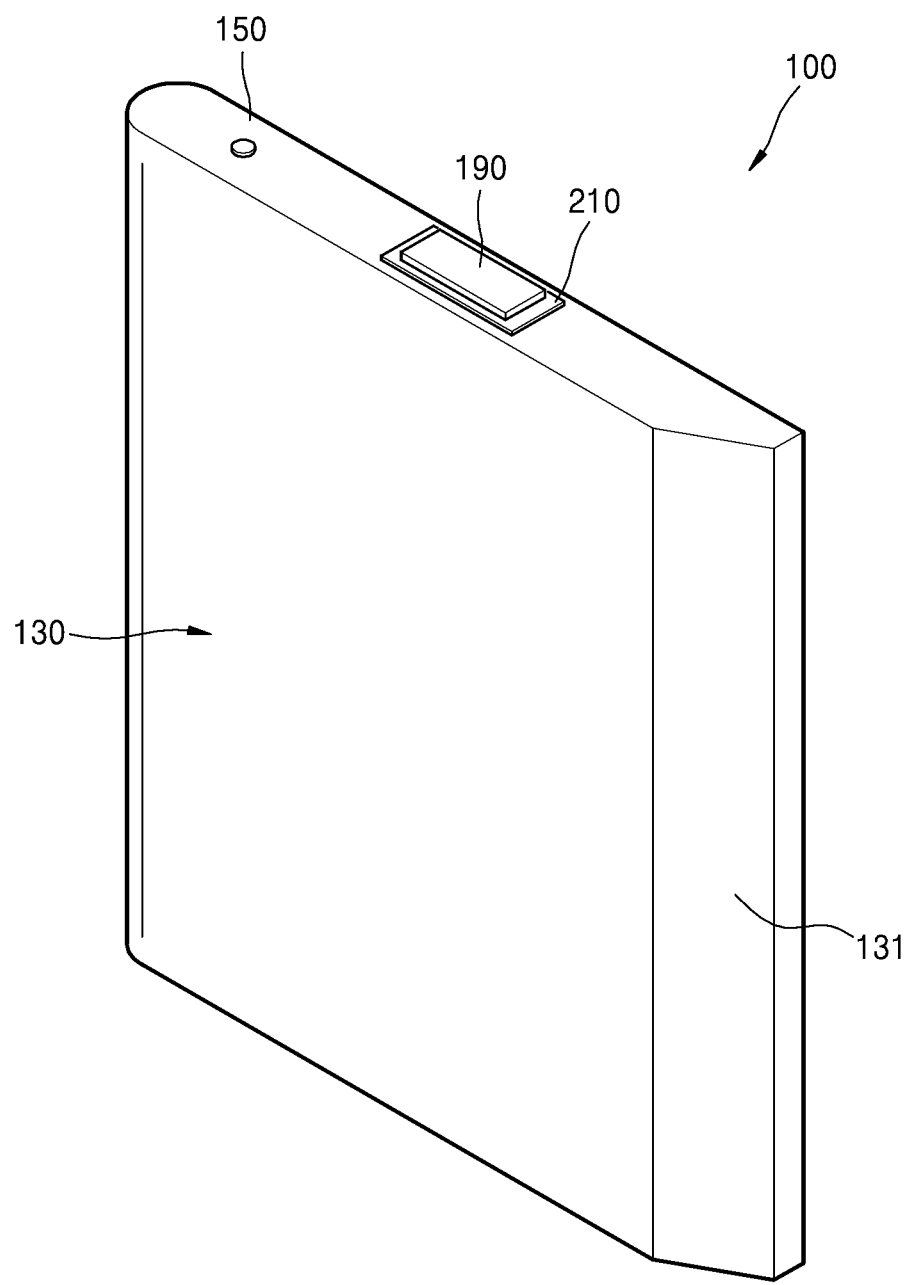
FIG. 1 is a perspective view illustrating a prismatic secondary battery according to an exemplary embodiment.

Reference will now be made in detail to exemplary embodiments, examples of which are illustrated in the accompanying drawings. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Moreover, detailed descriptions related to well-known functions or configurations will be ruled out in order not to unnecessarily obscure subject matters of the exemplary embodiments.

It will be understood that although the terms "first" and "second" are used herein to describe various elements, these elements should not be limited by these terms. Terms are only used to distinguish one element from other elements.

In the following description, the technical terms are used only for explaining a specific exemplary embodiment while not limiting the inventive concept. The meaning of 'include' or 'comprise' specifies a property, a fixed number, a step, a process, an element, a component, and a combination thereof but does not exclude other properties, fixed numbers, steps, processes, elements, components, and combinations thereof.

Hereinafter, secondary batteries will be described in detail with reference to the accompanying drawings according to exemplary embodiments. In the drawings, like reference numerals denote like elements, and overlapping descriptions thereof will be omitted.

Figure 2:
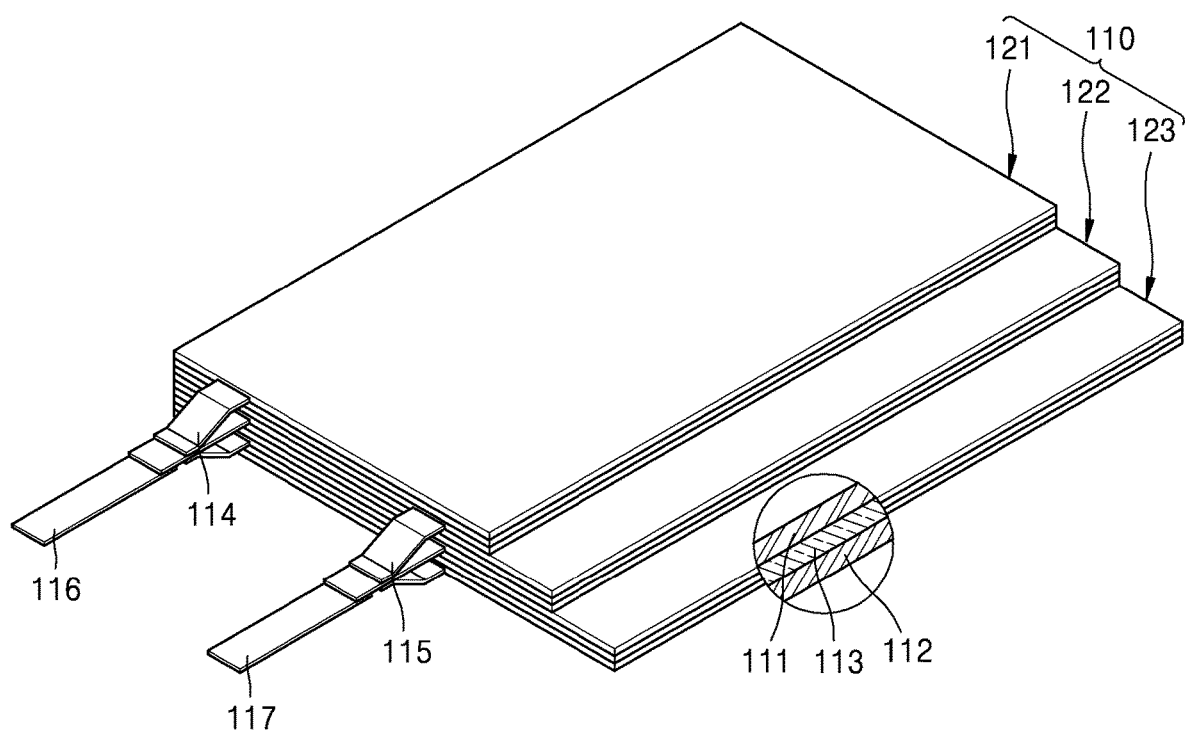
FIG. 2 is a perspective view illustrating an electrode assembly illustrated in FIG. 1.
Figure 3:
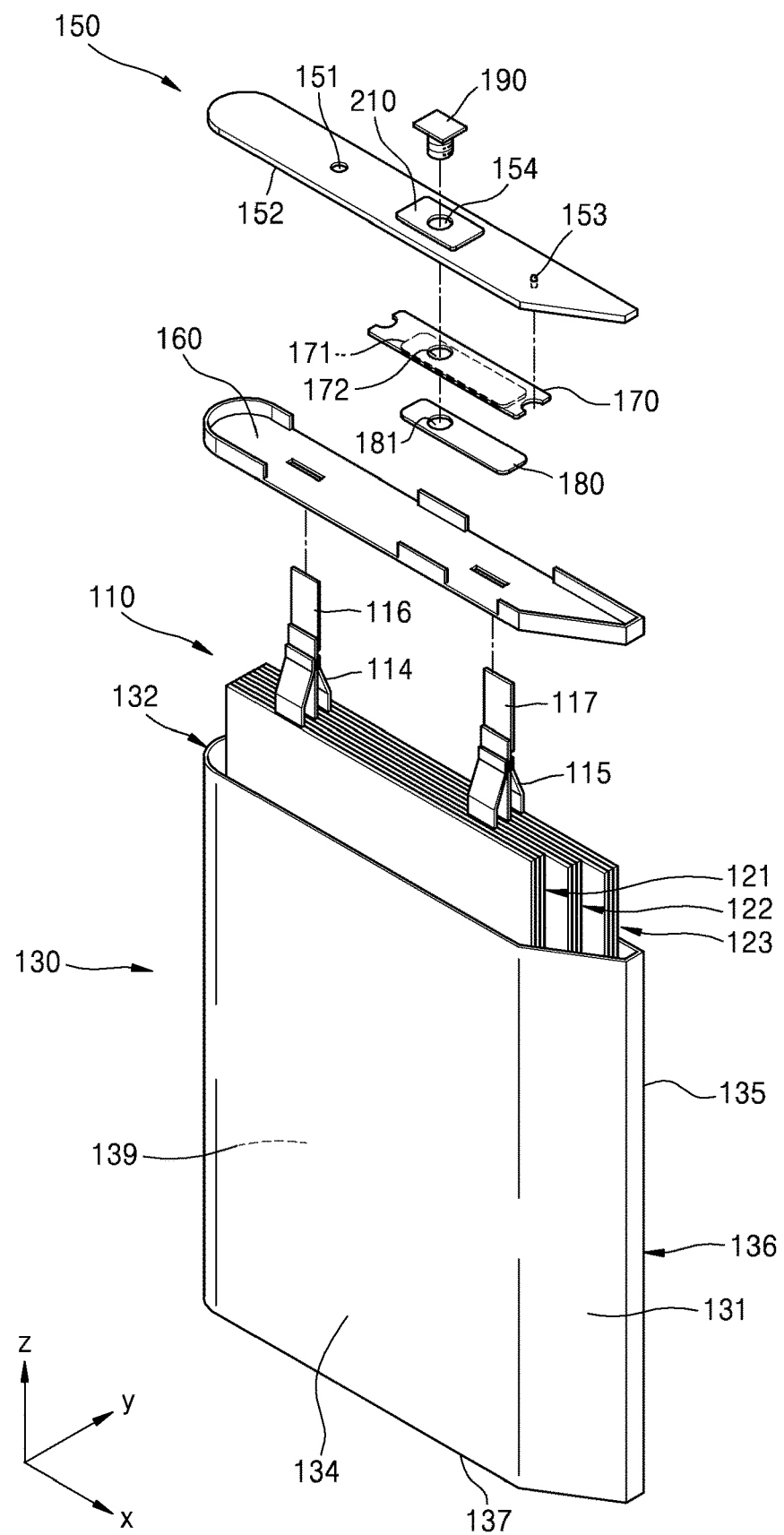
FIG. 3 is an exploded perspective view illustrating the prismatic secondary battery illustrated in FIG. 1.
Figure 4:
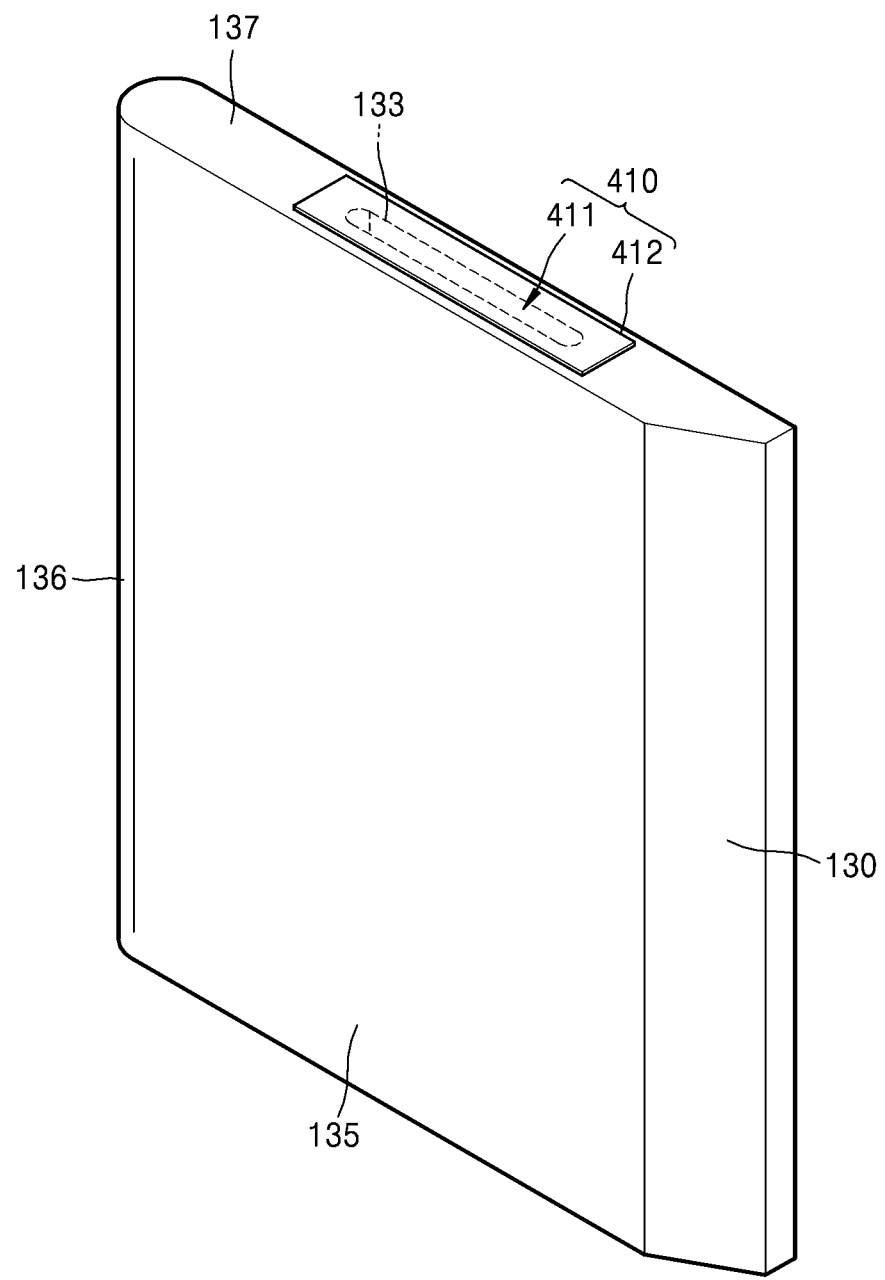
FIG. 4 is a perspective view illustrating the prismatic secondary battery of FIG. 1 from another direction.

FIG. 1 is a perspective view illustrating a prismatic secondary battery 100 to an exemplary embodiment, and FIG. 2 is a perspective view illustrating an electrode assembly 110 illustrated in FIG. 1. FIG. 3 is an exploded perspective view illustrating the prismatic secondary battery 100 illustrated in FIG. 1, and FIG. 4 is a perspective view illustrating the prismatic secondary battery 100 of FIG. 1 in an opposite direction.

Referring to FIGS. 1 to 4, the prismatic secondary battery 100 includes the electrode assembly 110, a case 130 accommodating the electrode assembly 110, and a cap plate 150 sealing the case 130.

The electrode assembly 110 includes first electrode plates 111, second electrode plates 112, and separators 113 disposed between the first electrode plates 111 and the second electrode plates 112. The electrode assembly 110 may have a stacked structure formed by stacking the first electrode plates 111, the separators 113, and the second electrode plates 112.

In the current embodiment, the electrode assembly 110 is a stacked-type electrode assembly in which electrode plates having different polarities are stacked. However, the electrode assembly 110 is not limited thereto. That is, the electrode assembly 110 may have any other structure such as a jelly-roll structure in which electrode plates having different polarities are rolled in one direction or a stacked and folded structure in which a stacked structure and a jelly-roll structure are combined.

The first electrode plates 111 and the second electrode plates 112 have different polarities. If the first electrode plates 111 are positive electrode plates, the second electrode plate 112 are negative electrode plates. On the other hand, if the first electrode plates 111 are negative electrode plates, the second electrode plates 112 are positive electrode plates. In the current embodiment, it is assumed that the first electrode plates 111 are positive electrode plates, and the second electrode plates 112 are negative electrode plates.

Each of the first electrode plates 111 may include a first electrode coating portion coated with a first electrode active material, and a first electrode non-coating portion not coated with the first electrode active material.

For example, the first electrode coating portion is formed by coating at least one surface of a first metal plate with the first electrode active material. The first electrode non-coating portion is a portion of the first metal plate not coated with the first electrode active material.

The first metal plate may include an aluminum plate. The first electrode active material may include a lithium-containing transition metal oxide such as $LiCoO_2$, $LiNiO_2$, $LiMnO_2$, or $LiMnO_4$, or a lithium chalcogenide.

First electrode tabs 114 may be electrically connected to the first electrode plates 111. The first electrode tabs 114 may be electrically connected to the first electrode non-coating portions, for example, by welding. Alternatively, each of the first electrode tabs 114 may be formed as one piece with a corresponding first electrode non-coating portion and may extend therefrom.

In the current embodiment, the first electrode tabs 114 may extend respectively from the first electrode plates 111. The first electrode tabs 114 are combined at a short side of the electrode assembly 110. All of the first electrode tabs 114 may be connected to a single first electrode lead 116.

Each of the second electrode plates 112 may include a second electrode coating portion coated with a second electrode active material, and a second electrode non-coating portion not coated with the second electrode active material.

For example, the second electrode coating portion is formed by coating at least one surface of a second metal plate with the second electrode active material. The second electrode non-coating portion is a portion of the second metal plate not coated with the second electrode active material.

The second metal plate may include a copper plate. The second electrode active material may include a carbon material such as crystalline carbon, amorphous carbon, a carbon composite, or carbon fiber, a lithium metal, or a lithium alloy.

Second electrode tabs 115 may be electrically connected to the second electrode plates 112. The second electrode tabs 115 may be electrically connected to the second electrode non-coating portions, for example, by welding. Alternatively, each of the second electrode tabs 115 may be formed as one piece with a corresponding second electrode non-coating portion and may extend therefrom.

Like in the first electrode plates 111, the second electrode tabs 115 may extend respectively from the second electrode plates 112. The second electrode tabs 115 are combined at the same short side of the electrode assembly 110 at which the first electrode tabs 114 are combined. All of the second electrode tabs 115 may be connected to a single second electrode lead 117.

Each of the separators 113 may be a porous polymer film such as a polyethylene film or a polypropylene film or may be woven fabric or non-woven fabric including polymer fabric. The separators 113 may include ceramic particles or may be formed of solid polymer electrolyte.

The separators 113 may be independent films, or may be non-conductive porous layers formed on the first electrode plates 111 or the second electrode plates 112. The separators 113 electrically separate the first electrode plates 111 and the second electrode plates 112. The shape of the separators 113 may be identical to or different from the shape of the first and second electrode plates 111 and 112.

The electrode assembly 110 includes a plurality of sub-electrode assemblies 121 to 123. The sub-electrode assemblies 121 to 123 include a first sub-electrode assembly 121, a second sub-electrode assembly 122, and a third sub-electrode assembly 123. In the current embodiment, the number of the sub-electrode assemblies 121 to 123 is three. However, the number of the sub-electrode assemblies 121 to 123 is not limited thereto.

Each of the sub-electrode assemblies 121 to 123 includes the first electrode plate 111, the second electrode plate 112, and the separator 113 disposed between the first electrode plate 111 and the second electrode plate 112. The first sub-electrode assembly 121, the second sub-electrode assembly 122, and the third sub-electrode assembly 123 are stacked in one direction (a vertical direction in FIG. 2).

Secondary batteries for use in electronic/electric devices may be required to have various shapes to efficiently use the inner spaces of the electronic/electric devices. For example, a stepped secondary battery, which is a kind of stacked-type secondary battery, may be optimally shaped according to the shape of a device in which the stepped secondary battery will be used. A stepped secondary battery may be efficiently disposed in a device while minimizing or reducing a dead space.

To provide the prismatic secondary battery 100 as a stepped secondary battery, the first sub-electrode assembly 121, the second sub-electrode assembly 122, and the third sub-electrode assembly 123 of the electrode assembly 110 may have different sizes.

In the current embodiment, the first sub-electrode assembly 121 has a first size, the second sub-electrode assembly 122 has a second size, and the third sub-electrode assembly 123 has a third size. The size of the first sub-electrode assembly 121 is smaller than the size of the second sub-electrode assembly 122, and the size of the second sub-electrode assembly 122 is smaller than the size of the third sub-electrode assembly 123.

The first to third sub-electrode assemblies 121 to 123 may form stepped portions on a long side of the electrode assembly 110. In the current embodiment, a long side of the electrode assembly 110 is stepped. However, the electrode assembly 110 may be variously shaped. For example, a short side or short and long sides of the electrode assembly 110 may be stepped.

The case 130 includes an electrode assembly accommodation cavity 139 as a space for accommodating the electrode assembly 110 therein. An opening 132 is formed in a short side of the case 130 so that the electrode assembly 110 may be inserted into the electrode assembly accommodation cavity 139 through the opening 132.

The case 130 may be a can formed of a metallic material. For example, the case 130 may be formed of aluminum or an aluminum alloy. Therefore, the case 130 may protect the electrode assembly 110 from impacts, and during charging and discharging operations of the electrode assembly 110, the case 110 may function as a heat-dissipation plate to dissipate heat from the electrode assembly 110 to the outside.

The case 130 may have a shape corresponding to the stepped structure of the electrode assembly 110 to accommodate the electrode assembly 110.

In the current embodiment, the case 130 has a slope 131 on a long side thereof. In other exemplary embodiments, however, the case 130 may have a slope on a short side thereof or slopes on short and long sides thereof according to the shape of a device in which the case 130 will be disposed. In an exemplary embodiment, at least one surface of the case 130 may be curved.

The cap plate 150 may seal the opening 132 of the case 130. Like the case 130, the cap plate 150 may be formed of a metallic material such as aluminum or an aluminum alloy. Contact portions of the cap plate 150 and the case 130 may be joined together by a method such as a laser welding method.

The cap plate 150 may be disposed on an insulation case 160 and then may be coupled to the case 130 having the opening 132 for sealing the case 130.

The cap plate 150 may include an electrolyte inlet 151. After the cap plate 150 is coupled to the case 130, electrolyte may be filled in the case 130 through the electrolyte inlet 151. After the electrolyte is completely filled, the electrolyte inlet 151 may be closed.

In an exemplary embodiment, electrolyte may be filled in the case 130 through a gas discharge hole (not shown) formed in the case 130. In this case, the electrolyte inlet 151 may not be used.

An insulation plate 170 and a terminal plate 180 may be disposed between the case 130 and the cap plate 150.

The insulation plate 170 may be formed of an insulation material and may prevent a short circuit between the cap plate 150 and the terminal plate 180.

The terminal plate 180 may be disposed in a mount recess 171 formed in the insulation plate 170. The terminal plate 180 may be formed of a metallic material such as a nickel alloy. The second electrode lead 117 may be electrically connected to a portion of the terminal plate 180.

The cap plate 150 has a first surface 152 facing the case 130 and a second surface 153 opposite the first surface 152, and an electrode pin 190 may be disposed on the second surface 153 of the cap plate 150. The electrode pin 190 may be inserted into terminal penetration holes 154, 172, and 181 respectively formed in the cap plate 150, the insulation plate 170, and the terminal plate 180, and then the electrode pin 190 may be connected to the terminal plate 180. Since the terminal plate 180 is connected to the second electrode lead 117 of the electrode assembly 110, the electrode pin 190 may be electrically connected to the second electrode plates 112.

The first electrode lead 116 may be directly connected to the first surface 152 of the cap plate 150.

A gasket 210 may be disposed around the terminal penetration hole 154 of the cap plate 150. The gasket 210 may be formed of the same insulation material as that used to form the insulation plate 170. The cap plate 150 and the electrode pin 190 may be insulated from each other by the gasket 210.

The case 130 may have a thin thickness to increase the capacity of the prismatic secondary battery 100 according to a recent trend toward high-capacity batteries. However, if the case 130 has a thin thickness, the case 130 is deformed due to gas generated during a pre-charging operation of the electrode assembly 110.

In the current embodiment, a gas discharge hole 133 may be formed in a side of the case 130 to discharge gas generated during a pre-charging operation and thus to prevent deformation of the case 130.

The gas discharge hole 133 may be sealed in an assembling process of the prismatic secondary battery 100. The gas discharge hole 133 may be sealed with a gas seal 410. The case 130 may be formed of a first material having rigidity, and the gas seal 410 may be formed of a second material having flexibility.

This will now be described in more detail.

The case 130 includes a first surface 134, a second surface 135 facing the first surface 134, third surfaces 136 connected to the first surface 134 and the second surface 135, and a fourth surface 137 opposite the opening 132 and connected to the first surface 134, the second surface 135, and the third surfaces 136.

The first surface 134 and the second surface 135 are separate from each other in a y-axis direction by a predetermined distance as shown in FIG. 3. The first surface 134 and the second surface 135 may be disposed in a direction perpendicular to a direction in which the cap plate 150 is disposed.

The third surfaces 136 may be connected to both edges of the first surface 134 in a width direction (x-axis direction in FIG. 3) and both edges of the second surface 135 in the width direction (x-axis direction in FIG. 3). The third surfaces 136 may include the slope 131. The third surfaces 136 are lateral surfaces connecting the first surface 134 forming the front side of the prismatic secondary battery 100 to the second surface 135 forming the rear side of the prismatic secondary battery 100.

The fourth surface 137 may be connected to lower edges of the first surface 134 and the second surface 135. The fourth surface 137 is a bottom surface of the prismatic secondary battery 100. The first surface 134 and the second surface 135 may extend upright from both long side edges of the fourth surface 137, respectively. The third surfaces 136 may extend upright from both short side edges of the fourth surface 137, respectively.

The first surface 134, the second surface 135, the third surfaces 136, and the fourth surface 137 may be continuously connected to form the electrode assembly accommodation cavity 139 in which the electrode assembly 110 inserted through the opening 132 is accommodated.

In the current embodiment, the case 130 has a hollow rectangular parallelepiped shape with a stepped portion. However, the case 130 may have any other shape as long as the case 130 has an inner space for accommodating the electrode assembly 110.

The gas discharge hole 133 may be formed in the fourth surface 137 as a passage for discharging gas generated during a pre-charging operation. The gas discharge hole 133 may be a penetration hole formed in the fourth surface 137 in a wall thickness direction of the case 130. The gas discharge hole 133 may communicate with the electrode assembly accommodation cavity 139.

In the current embodiment, the gas discharge hole 133 is formed in a bottom portion of the case 130 opposite to the opening 132 formed in a top portion of the case 130. However, the gas discharge hole 133 may be formed in any other portion of the case 130 as long as the gas discharge hole 133 functions as a passage for discharging gas generated during a pre-charging operation.

The gas discharge hole 133 may be sealed with the gas seal 410 after gas generated during a pre-charging operation is discharged through the gas discharge hole 133. In an assembling process of the prismatic secondary battery 100, when a gas collection unit 500 (refer to FIG. 5A) attached to a side of the case 130 is removed from the case 130, a portion of the gas collection unit 500 is thermally fused to the case 130 around the gas discharge hole 133 as the gas seal 410.

In the current embodiment, the gas seal 410 includes a first sealing part 411 covering the gas discharge hole 133 and a second sealing part 412 extending from the first sealing part 411.

The first sealing part 411 is disposed on the gas discharge hole 133 to completely cover the gas discharge hole 133. The second sealing part 412 is formed as one piece with the first sealing part 411 and extends from edges of the first sealing part 411. The second sealing part 412 is disposed on the fourth surface 137 of the case 130 around the gas discharge hole 133. The second sealing part 412 is directed attached to the fourth surface 137 of the case 130 by thermal fusing.

As described above, after the gas collection unit 500 is removed from the case 130, the gas discharge hole 133 is completely sealed with the gas seal 410 which is a portion of the gas collection unit 500.

In addition to the function of covering the gas discharge hole 133 after gas generated during a pre-charging operation is discharged through the gas discharge hole 133, the gas seal 410 may have an additional function of serving as a safety vent. That is, since the gas seal 410 is formed of the second material less rigid than the first material used to form the case 130, the gas seal 410 may be broken before the case 130 is broken.

In detail, the gas seal 410 may be formed of a pouch-type material having flexibility. The pouch-type material is a material usually used to form flexible cases of secondary batteries and is freely deformable into a particular shape.

The gas seal 410 includes a thin metal layer and a bonding layer formed on at least one surface of the thin metal layer. The metal layer may be formed of a material such as aluminum, steel, or stainless steel. The bonding layer may be formed of an insulation material processable in a thermal fusing process, such as polypropylene, polyethylene, polyethylene terephthalate, an ethylene-propylene copolymer, or nylon. The bonding layer is thermally fused to the fourth surface 137 of the case 130.

Figure 5A:
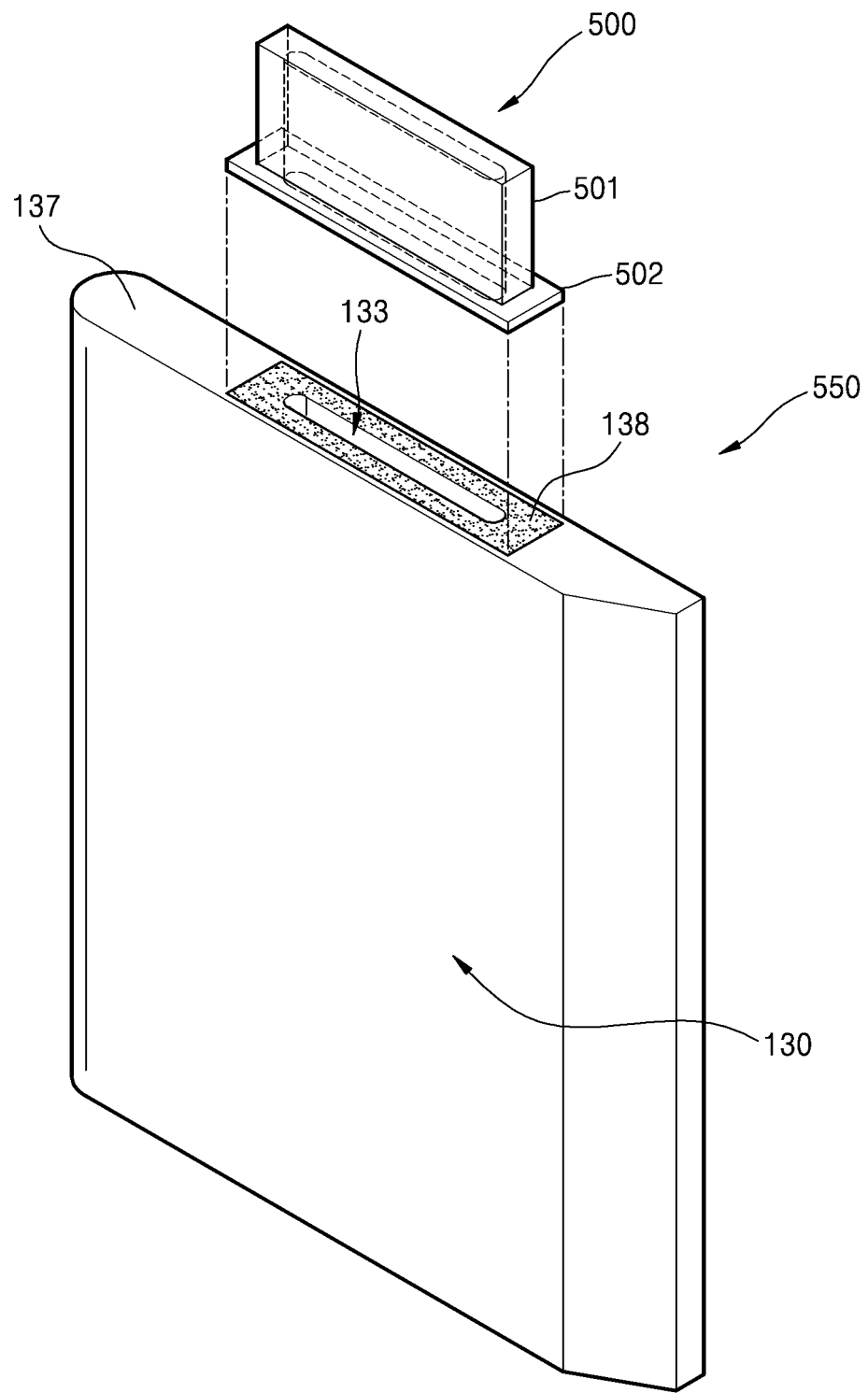
FIG. 5A is an exploded perspective view illustrating the prismatic secondary battery of FIG. 1 before a gas collection unit is attached to a case of the prismatic secondary battery.
Figure 5B:
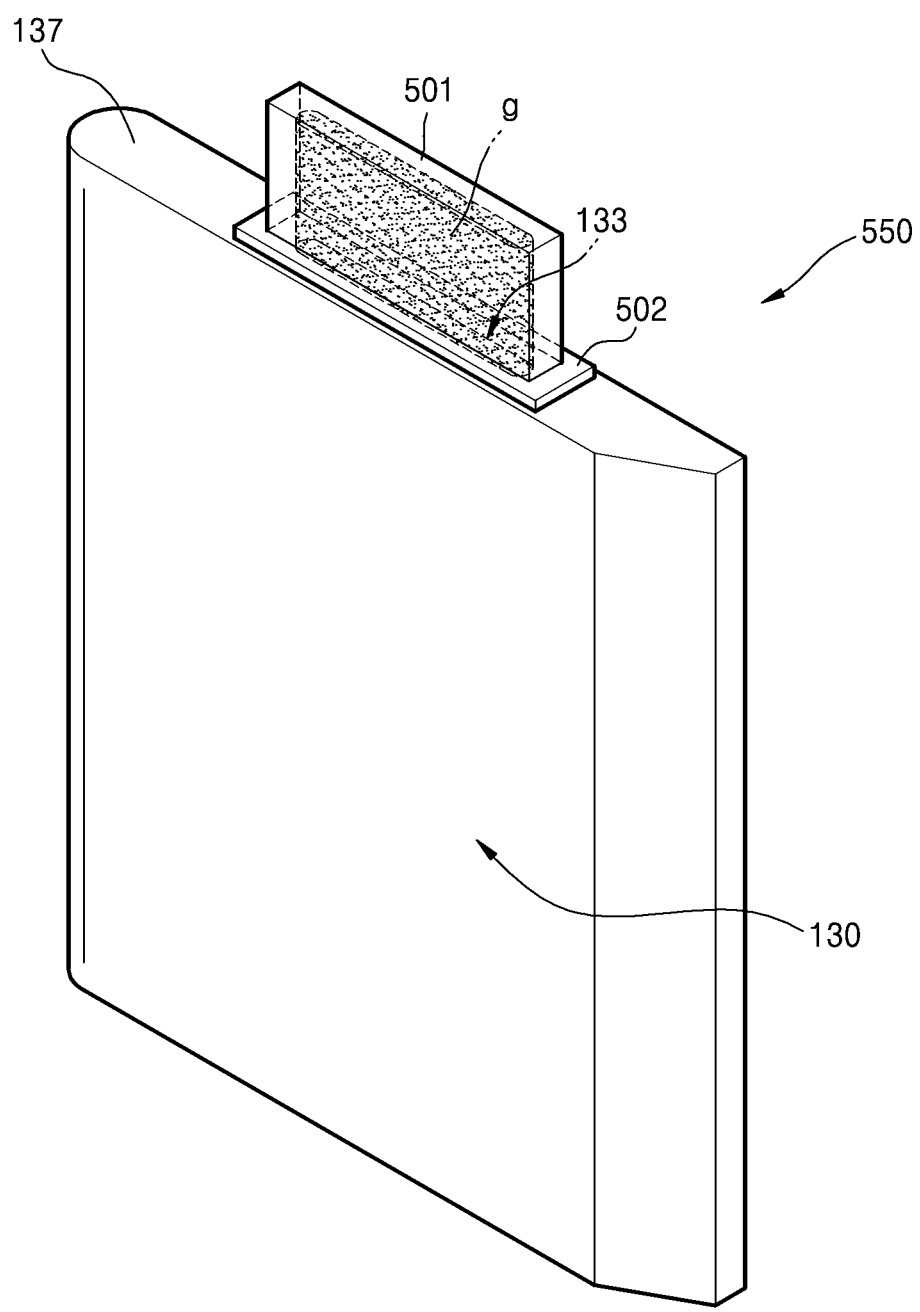
FIG. 5B is a perspective view illustrating the prismatic secondary battery of FIG. 5A after the gas collection unit is attached to the case of the prismatic secondary battery.
Figure 6:
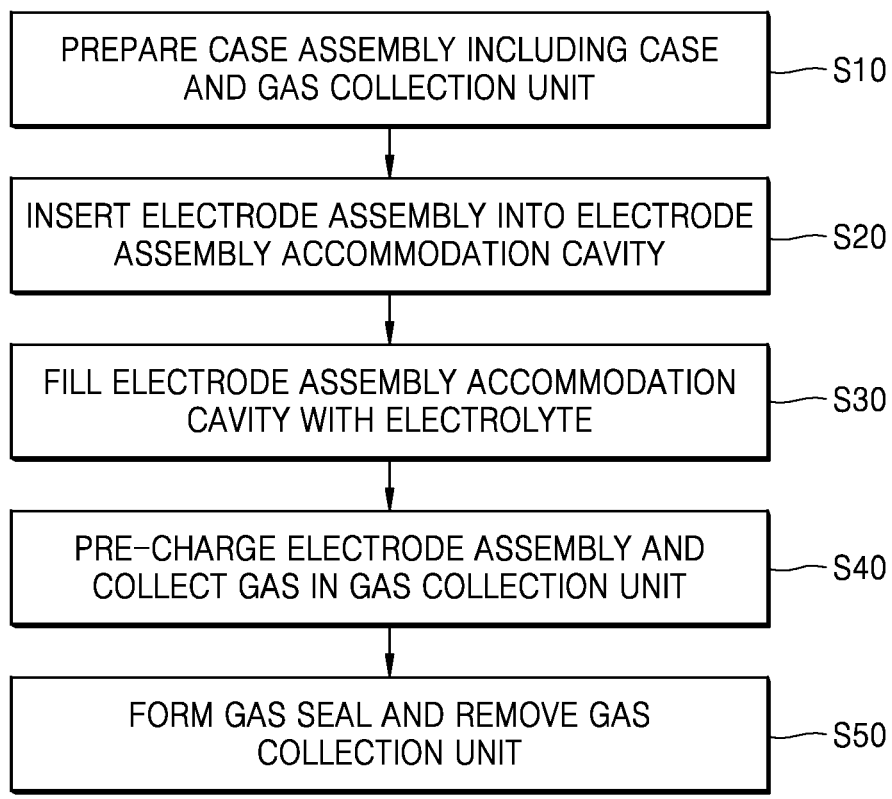
FIG. 6 is a flowchart illustrating a method of fabricating the prismatic secondary battery of FIG. 1.

FIG. 5A is an exploded perspective view illustrating the prismatic secondary battery 100 of FIG. 1 before the gas collection unit 500 is attached to the case 130 of the prismatic secondary battery 100, and FIG. 5B is a perspective view illustrating the prismatic secondary battery 100 of FIG. 5A after the gas collection unit 500 is attached to the case 130 of the prismatic secondary battery 100. FIG. 6 is a flowchart illustrating a method of fabricating the prismatic secondary battery 100 of FIG. 1.

The method of fabricating the above-described prismatic secondary battery 100 will now be described with reference to FIGS. 1 to 6.

First, a case assembly 550 is prepared by coupling the gas collection unit 500 to the fourth surface 137 of the case 130 in which the electrode assembly accommodation cavity 139 is formed to accommodate the electrode assembly 110 (S10).

In detail, referring to FIG. 5A, the gas discharge hole 133 is formed in the fourth surface 137, which is the bottom surface of the case 130, in the wall thickness direction of the case 130. The gas collection unit 500 is coupled to the fourth surface 137. The gas discharge hole 133 provides a passage for discharging gas generated in the electrode assembly accommodation cavity 139 during a pre-charging operation.

The gas collection unit 500 is formed of a flexible pouch-type material. The gas collection unit 500 includes a thin metal layer and a bonding layer formed on at least one surface of the thin metal layer.

The gas collection unit 500 includes a main body 501 having an inner space for collecting gas discharged through the gas discharge hole 133, and a connection part 502 formed on a lower end of the main body 501 to face the fourth surface 137 of the case 130. The connection part 502 may be a flange horizontally extending from lower edges of the main body 501 by a predetermined width. The gas collection unit 500 has a rectangular cap shape.

The connection part 502 is brought into contact with a connection region 138 of the fourth surface 137 along the periphery of the gas discharge hole 133. Thereafter, pressure and heat are applied to the connection part 502 to completely attach the gas collection unit 500 to the case 130 as shown in FIG. 5B.

After the gas discharge hole 133 is completely sealed by thermally fusing the connection part 502 to the connection region 138 of the case 130, the electrode assembly accommodation cavity 139, the gas discharge hole 133, and the space formed in the main body 501 of the gas collection unit 500 for collecting gas may be connected to each other.

Next, the electrode assembly 110 is inserted into the case 130 through the opening 132 (S20).

After the electrode assembly 110 is inserted, the opening 132 is sealed with the cap plate 150.

Then, electrolyte is supplied to the electrode assembly accommodation cavity 139 in which the electrode assembly 110 is accommodated (S30).

The electrolyte may be supplied to the electrode assembly accommodation cavity 139 through the electrolyte inlet 151 formed in the cap plate 150. After the electrolyte is completely filled, the electrolyte inlet 151 may be closed.

In an embodiment, the electrolyte inlet 151 may not be formed in the cap plate 150. In this case, electrolyte may be supplied through the gas discharge hole 133, and then the gas collection unit 500 may be coupled to the case 130.

In an embodiment, after the gas collection unit 500 is coupled to the case 130, an electrolyte inlet may be formed in a side of the gas collection unit 500. In this case, the electrolyte inlet may be closed after electrolyte is supplied through the electrode inlet.

That is, electrolyte may be supplied to the inside of the case 130 by any method without limitations.

Next, as shown in FIG. 5B, the electrode assembly 110 is pre-charged, and gas (g) generated in the case 130 during the pre-charging of the electrode assembly 110 is collected in the gas collection unit 500 through the gas discharge hole 133 (S40).

In detail, when the prismatic secondary battery 100 is manufactured, a pre-charging test is performed on the prismatic secondary battery 100, and during the pre-charging test, gas (g) is generated in the case 130. The gas (g) is discharged through the gas discharge hole 133 from the electrode assembly accommodation cavity 139 of the case 130 and collected in the gas collection unit 500.

Then, a portion of the gas collection unit 500 may be opened to discharge the gas (g) from the gas collection unit 500. At this time, a vacuum may be formed in the outside of the gas collection unit 500.

Thereafter, the gas seal 410 is formed to seal the gas discharge hole 133, and then the gas collection unit 500 is removed, thereby completely manufacturing the prismatic secondary battery 100 (S50).

In detail, after the gas (g) is discharged from the case 130 (a degassing process), heat and pressure are applied to a lower end of the gas collection unit 500 that is adjacent to the gas discharge hole 133, so as to fuse a portion of the gas collection unit 500. Then, the fused portion of the gas collection unit 500 is formed into the gas seal 410 (refer to FIG. 4), and the gas discharge hole 133 is sealed with the gas seal 410.

When the gas seal 410 is formed, the gas collection unit 500 is cut at a position close to a sealed region to separate the gas collection unit 500 from the case 130.

In this way, the gas seal 410 made of a flexible material unlike the case 130 made of a rigid material is formed on the fourth surface 137 of the case 130 to completely seal the gas discharge hole 133.

The gas seal 410 may be formed by various methods.

Figure 7A:
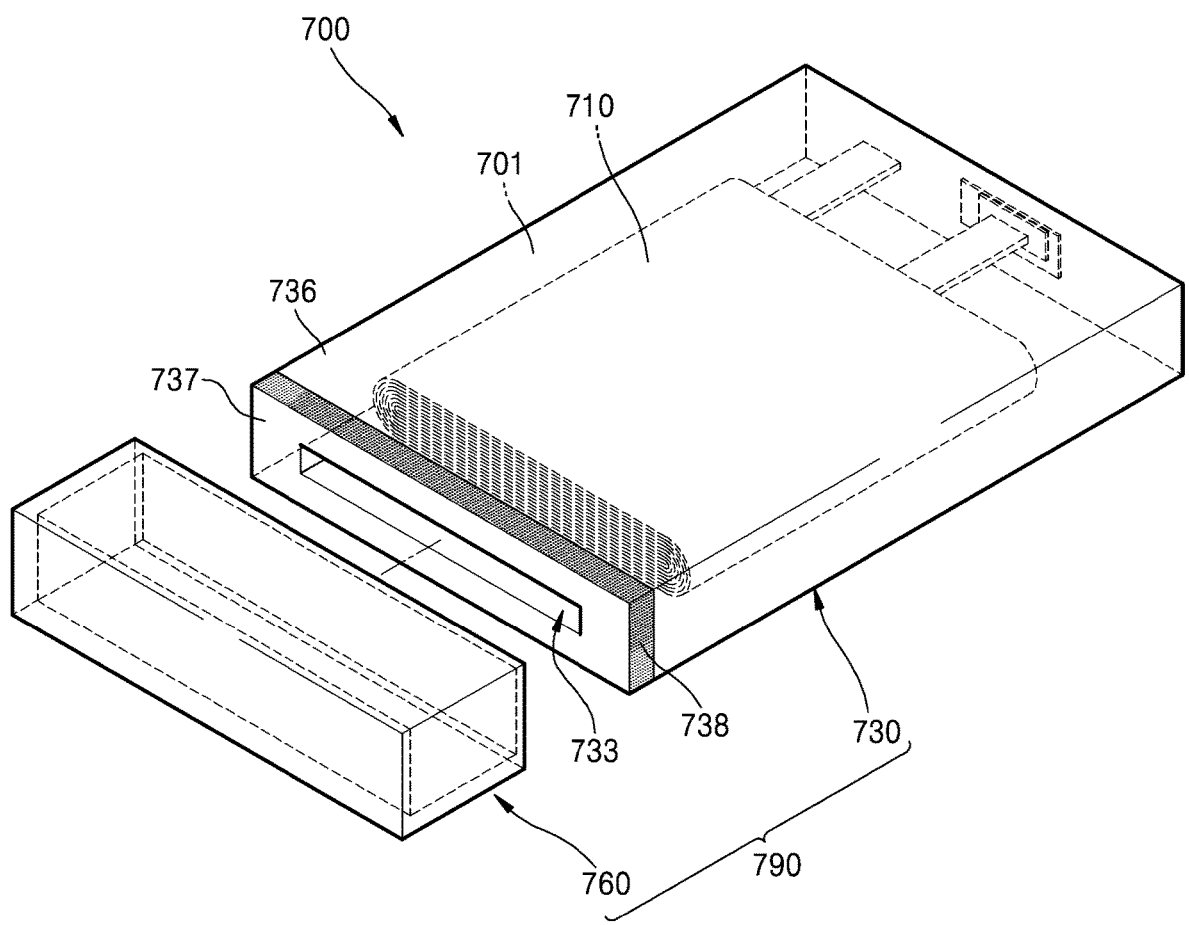
FIG. 7A is an exploded perspective view illustrating a prismatic secondary battery before a gas collection unit is attached to a case of the prismatic secondary battery, according to another exemplary embodiment.
Figure 7B:
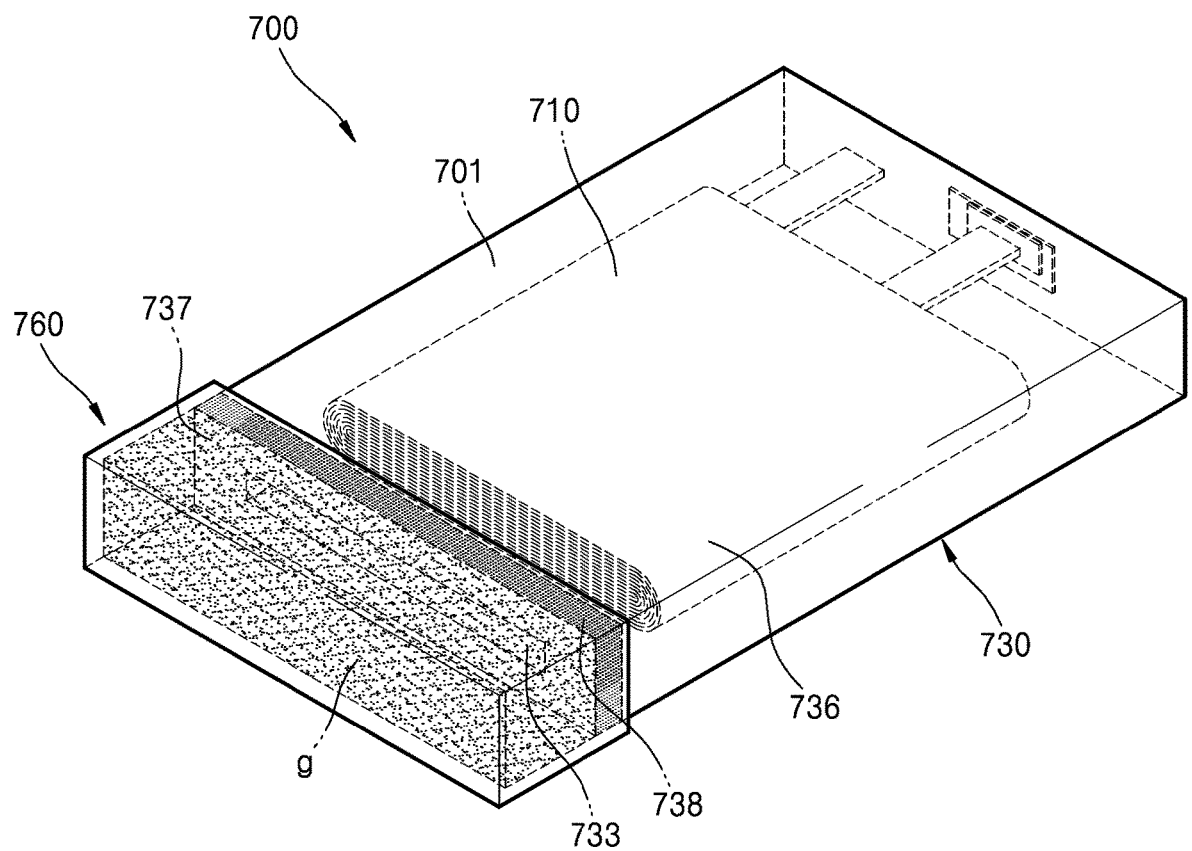
FIG. 7B is a perspective view illustrating the prismatic secondary battery of FIG. 7A after the gas collection unit is attached to the case.

FIG. 7A is an exploded perspective view illustrating a prismatic secondary battery 700 before a gas collection unit 760 is attached to a case 730 of the prismatic secondary battery 700, according to another exemplary embodiment, and FIG. 7B is a perspective view illustrating the prismatic secondary battery 700 of FIG. 7A after the gas collection unit 760 is attached to the case 730.

First, a case assembly 790 is prepared by preparing the case 730 in which an electrode assembly accommodation cavity 701 is formed to accommodate an electrode assembly 710, and coupling the gas collection unit 760 to a bottom surface 737 of the case 730 in which a gas discharge hole 733 is formed.

In detail, referring to FIG. 7A, the gas discharge hole 733 is formed in the bottom surface 737 of the case 730. The gas collection unit 760 is coupled to a lower end of the case 730 on which the bottom surface 737 is formed.

The case 730 may be formed of a first material having rigidity, and the gas collection unit 760 may be formed of a second material having flexibility. In the current embodiment, the case 730 may be a metallic can, and the gas collection unit 760 may include a thin metal layer and a bonding layer formed on at least one surface of the metal layer and the thin metal layer may have a lower rigidity of the case in one exemplary embodiment.

The gas collection unit 760 has an inner space to collect gas discharged through the gas discharge hole 733 during a pre-charging operation. Lower end inner surfaces of the gas collection unit 760 facing the case 730 are brought into contact with connection regions 738 of lateral surfaces 736 of the case 730 that adjoin the bottom surface 737 of the case 730.

Thereafter, as shown in FIG. 7B, pressure and heat are applied to the gas collection unit 760 to completely attach the gas collection unit 760 to the case 730.

After the gas discharge hole 733 is completely sealed by thermally fusing the lower end inner surfaces of the gas collection unit 760 to the connection regions 738 of the case 730, the electrode assembly accommodation cavity 701, the gas discharge hole 733 formed in the bottom surface 737, and the inner space formed in the gas collection unit 760 for collecting gas may be connected to each other.

Next, the electrode assembly 710 is inserted into the case 730.

Instead of the stacked structure described in the previous embodiment, the electrode assembly 710 of the current embodiment may have a jelly-roll structure in which a first electrode plate, a separator, and a second electrode plate are sequentially stacked and wound in one direction.

Then, electrolyte is supplied to the inside of the case 730 in which the electrode assembly 710 is accommodated.

Next, as shown in FIG. 7B, the electrode assembly 710 is pre-charged, and gas (g) generated in the case 730 during the pre-charging of the electrode assembly 710 is collected in the gas collection unit 760 through the gas discharge hole 733. After the gas (g) is collected in the gas collection unit 760, a portion of the gas collection unit 760 may be opened to discharge the gas (g) to the outside.

Figure 7C:
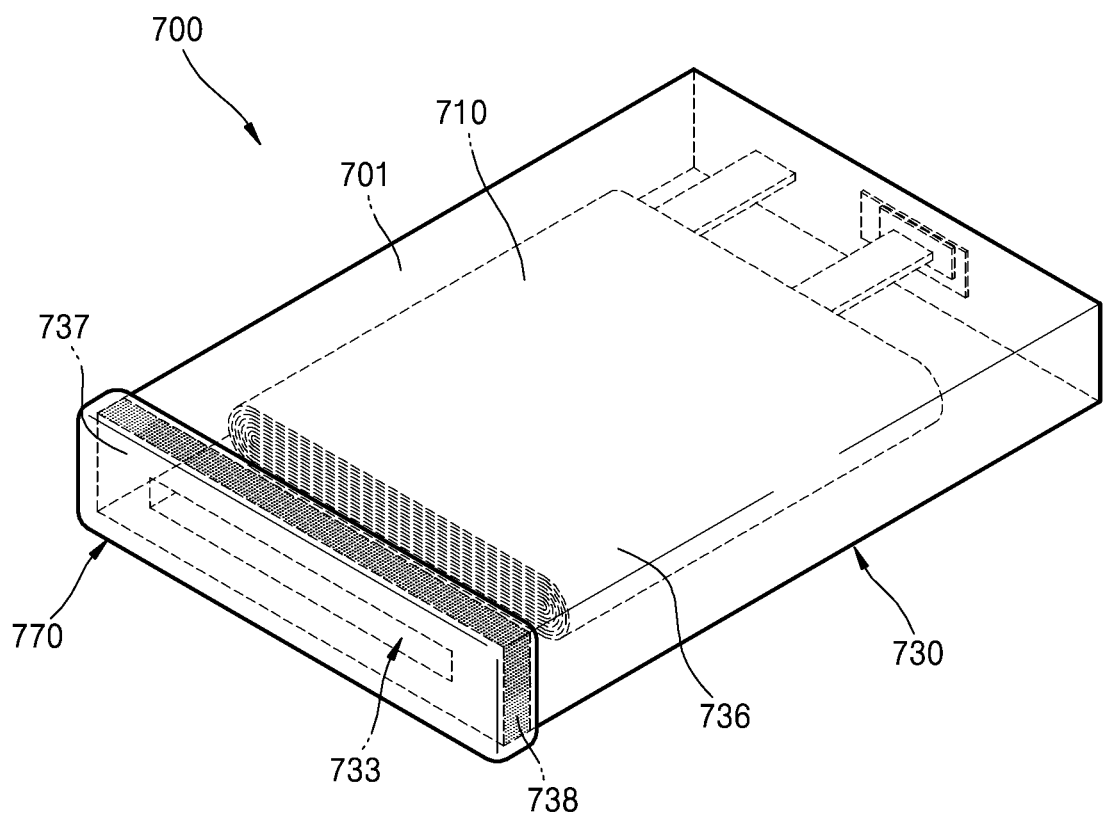
FIG. 7C is a perspective view illustrating the prismatic secondary battery of FIG. 7B after the gas collection unit is removed from the prismatic secondary battery.

Thereafter, as shown in FIG. 7C, a gas seal 770 is formed to seal the gas discharge hole 733, and then the gas collection unit 760 is removed, thereby completely manufacturing the prismatic secondary battery 700.

In the current embodiment, since the gas collection unit 760 surrounds the case 730, the gas seal 770 is formed by thermally fusing the gas collection unit 760 to the bottom surface 737 and the lateral surfaces 736 of the case 730 along the periphery of the gas discharge hole 733.

Figure 8A:
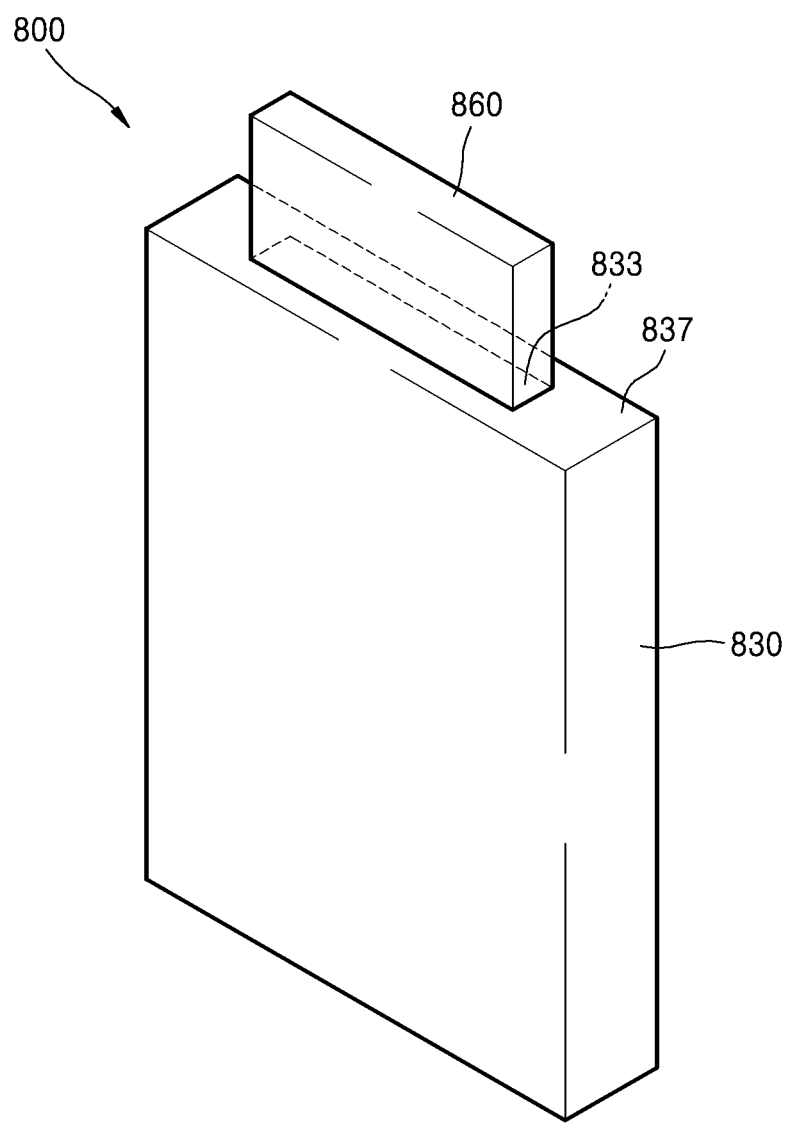
FIG. 8A is a perspective view illustrating a prismatic secondary battery after a gas collection unit is attached to a case of the prismatic secondary battery, according to another exemplary embodiment.
Figure 8B:
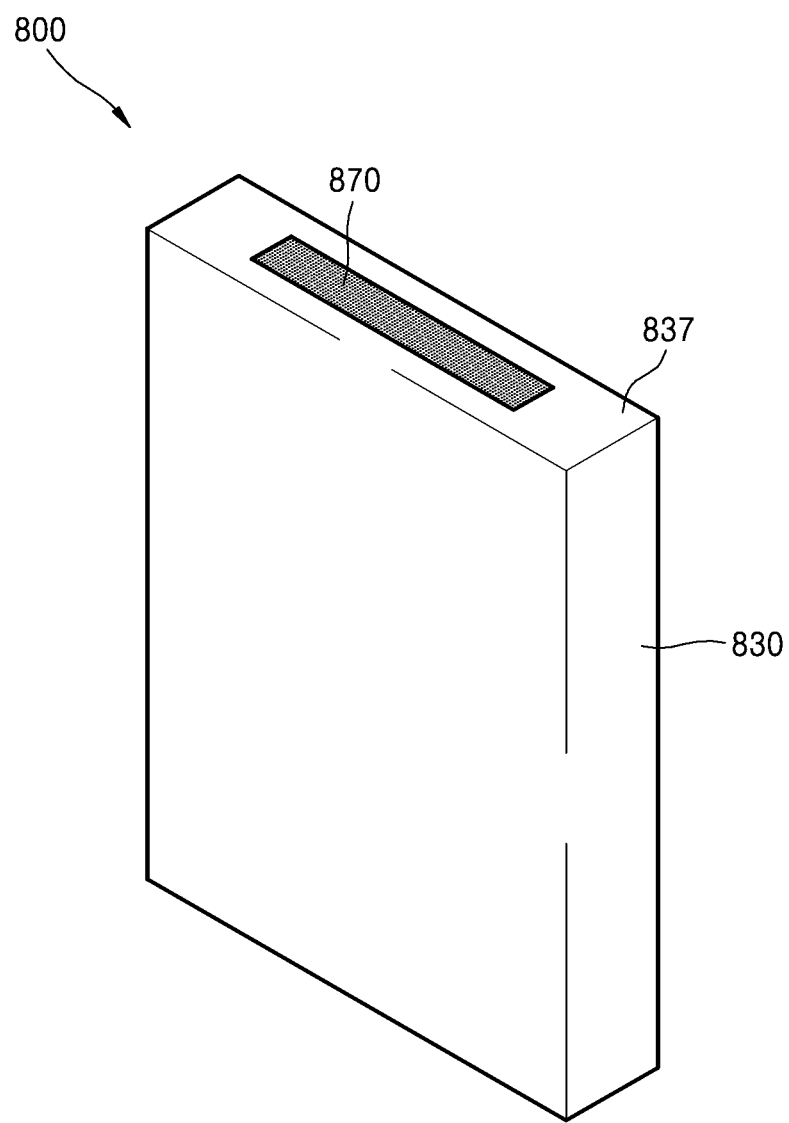
FIG. 8B is a perspective view illustrating the prismatic secondary battery of FIG. 8A after the gas collection unit is removed from the prismatic secondary battery.

FIG. 8A is a perspective view illustrating a prismatic secondary battery 800 after a gas collection unit 860 is attached to a case 830 of the prismatic secondary battery 700, according to another exemplary embodiment, and FIG. 8B is a perspective view illustrating the prismatic secondary battery 800 of FIG. 7A after the gas collection unit 860 is removed from the case 830.

Referring to FIG. 8A, a gas discharge hole 833 is formed in a bottom surface 837 of the case 830. The gas collection unit 860 is coupled to a lower end of the case 830 on which the bottom surface 837 is formed.

The case 830 is a metallic can, and the gas collection unit 860 is formed of a flexible material. For example, the gas collection unit 860 includes a thin metal layer and a bonding layer formed on at least one surface of the metal layer.

The gas collection unit 860 has an inner space to collect gas discharged through the gas discharge hole 833 during a pre-charging operation. A lower end of the gas collection unit 860 is thermally fused to inner wall surfaces of the case 830 that form the gas discharge hole 833.

After the pre-charging operation, heat and pressure are applied to form a gas seal 870 and thus to seal the gas discharge hole 833, and then the gas collection unit 860 is removed as shown in FIG. 8B. In this way, the prismatic secondary battery 800 is completely manufactured.

In the current embodiment, the gas collection unit 860 is fused to the inner wall surfaces of the case 830 that forms the gas discharge hole 833. Therefore, unlike in the previous embodiments, the gas seal 870 hermetically covers only the gas discharge hole 833.

As described above, the case assembly, the prismatic secondary battery, and the method of fabricating the prismatic secondary battery according to the one or more of the above embodiments, gas generated during a pre-charging operation may easily be discharged, and thus deformation of the case may be prevented.

Other effects of the exemplary embodiments may be understood from the above description with reference to the accompanying drawings.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A prismatic secondary battery comprising:
an electrode assembly comprising a first electrode plate, a second electrode plate, and a separator between the first and second electrode plates;
a case formed of a first material, wherein an electrode assembly accommodation cavity is formed in the case to accommodate the electrode assembly, and a plurality of walls that define an opening through which the electrode assembly is to be inserted; and
a cap plate sealing the opening, the cap plate having an electrolyte inlet configured to receive an electrolyte prior to a pre-charging operation,
wherein a gas discharge hole is formed in one of the walls of the case comprising a passage configured to discharge gas generated during the pre-charging operation, and
the gas discharge hole is sealed with a gas seal formed of a second material that is less rigid than the first material, the gas seal configured to be broken before the case is broken,
wherein the second material is a flexible pouch-type material comprising:
a thin metal layer; and
a bonding layer formed of an insulation material,
wherein the bonding layer thermally fuses the thin metal layer to the case.

2. The prismatic secondary battery of claim 1, wherein the gas discharge hole communicates with the electrode assembly accommodation cavity, and
the gas seal is thermally fused to a portion of the case in which the gas discharge hole is formed.

3. The prismatic secondary battery of claim 2, wherein the gas discharge hole is formed in a bottom portion of the case that is opposite the opening formed in a top portion of the case, and
the gas seal is thermally fused to at least a region of the bottom portion of the case, the region surrounding the gas discharge hole.

4. The prismatic secondary battery of claim 3, wherein the gas seal comprises:

a first sealing part covering the gas discharge hole; and
a second sealing part extending from the first sealing part and thermally fused to a connection region of the bottom portion of the case along a periphery of the gas discharge hole.

5. The prismatic secondary battery of claim 3, wherein the gas seal covers the gas discharge hole,
extends along a periphery of the gas discharge hole from the bottom portion of the case to a connection region of a lateral portion of the case connecting the bottom portion of the case and the top portion of the case, and
is thermally fused to the connection region.

6. The prismatic secondary battery of claim 3, wherein the gas seal is thermally fused to an inner wall surface of the case that forms the gas discharge hole.

7. The prismatic secondary battery of claim 1, wherein the case comprises a can formed of a metallic material.

8. The prismatic secondary battery of claim 1, wherein the case comprises:
a first surface;
a second surface separate from the first surface;
third surfaces forming lateral surfaces that connect the first and second surfaces; and
a fourth surface located opposite the opening and forming a bottom surface that connects the first surface, the second surface, and the third surfaces,
wherein the first surface, the second surface, the third surfaces, and the fourth surface are continuously connected to form the electrode assembly accommodation cavity, and
the gas discharge hole is formed in the fourth surface.

9. The prismatic secondary battery of claim 1, wherein the electrode assembly comprises a plurality of sub-electrode assemblies which have different sizes and are stacked in a stepped structure.

10. The prismatic secondary battery of claim 1, wherein the gas seal is planar and is disposed only on a bottom portion of the case.

11. The prismatic secondary battery of claim 1, wherein the gas seal overlaps a center portion of the case in the height dimension of the prismatic secondary battery.

12. The prismatic secondary battery of claim 1, wherein the cap plate material is the same as the first material.

13. The prismatic secondary battery of claim 1, wherein the first material is aluminum or an aluminum alloy.

* * * * *